United States Patent [19]

Sugitani et al.

[11] 4,351,910

[45] Sep. 28, 1982

[54] EXPANDABLE STYRENE SERIES RESIN COMPOSITION AND PROCESS FOR PRODUCTION THEREOF

[75] Inventors: Hatuo Sugitani, Ibaraki; Takeo Kudo; Yoshiyuki Mukoyama, both of Hitachi; Hiromasa Kawai, Ichihara, all of Japan

[73] Assignee: Hitachi Chemical Company, Ltd., Tokyo, Japan

[21] Appl. No.: 287,915

[22] Filed: Jul. 29, 1981

[30] Foreign Application Priority Data

Jul. 29, 1980 [JP] Japan .............................. 55-104539
Sep. 19, 1980 [JP] Japan .............................. 55-131323
Apr. 2, 1981 [JP] Japan .............................. 56-50428

[51] Int. Cl.$^3$ .............................. C08J 9/18; C08J 9/20
[52] U.S. Cl. .............................. 521/56; 521/59; 521/60; 521/139; 521/146; 521/147; 521/154
[58] Field of Search .............................. 521/56, 59, 60

[56] References Cited

U.S. PATENT DOCUMENTS

| | | | |
|---|---|---|---|
| 3,033,805 | 5/1962 | Rubens et al. | 521/56 |
| 3,505,253 | 4/1970 | Finestone et al. | 521/56 |
| 3,635,852 | 1/1972 | Finestone et al. | 521/56 |
| 3,657,162 | 4/1972 | Finestone et al. | 521/56 |
| 3,657,164 | 4/1972 | Jastrow et al. | 521/56 |
| 3,835,073 | 9/1974 | Thimas | 521/56 |

Primary Examiner—Morton Foelak
Attorney, Agent, or Firm—Antonelli, Terry & Wands

[57] ABSTRACT

An expandable styrene series resin composition comprising a styrene series resin containing in its molecular structure a group of the formula:

$$-SiY_nR_{3-n} \qquad (I)$$

wherein R is an inert monovalent organic group; Y is a hydrolyzable group; and n is an integer of 1 to 3, and a blowing agent, and if necessary, one or more organosilane compounds having at least two hydrolyzable groups in its molecule, can give foamed articles having excellent heat resistance as well as high degree of expansion and good physical and chemical properties.

22 Claims, No Drawings

EXPANDABLE STYRENE SERIES RESIN COMPOSITION AND PROCESS FOR PRODUCTION THEREOF

This invention relates to an expandable styrene series resin composition excellent in heat resistance and a process for producing the same.

A styrene series resin containing 1 to 20% by weight of an easily volatile blowing agent such as propane, butane, pentane, methyl chloride, dichloromonofluoromethane, or the like is known as an expandable styrene series resin. When such an expandable styrene series resin is heated with steam or the like, it expands by producing a large number of small closed cells, so that it can easily produce a cellular styrene series resin product having a shape in accordance with a mold employed by using a closed mold or by an extrusion molding process. Such a molded cellular product is used as a food container, a shock absorbing material, a heat insulating material, a float and the like. But since a poly-styrene series resin is used as a major component, the cellular product is poor in heat resistance and cannot maintain original form due to shrinkage when exposed to a temperature higher than 100° C. for a long period of time.

There have been made many proposals for improving the heat resistance. For example, there are proposals of blending with such a polymer as polyethylene, polypropylene, poly(phenylene ether), or the like; copolymerization with maleic anhydride (British Pat. No. 1,352,563); the use of a silicone oil; the addition of a crosslinking agent; and the like. But the resulting expandable resin compositions obtained by the above-mentioned proposals have disadvantages in that the degree of expansion is not so high and the heat resistance is still insufficient.

This invention provides an expandable styrene series resin composition and processes for production thereof overcoming the above-mentioned problems.

This invention provides an expandable styrene series resin composition comprising a styrene series resin containing in its molecular structure one or more groups of the formula:

$$-\text{SiY}_n\text{R}_{3-n} \qquad (I)$$

wherein R is an inert monovalent organic group; Y is a hydrolyzable group; and n is an integer of 1 to 3, and a blowing agent, and if necessary, one or more organosilane compounds having at least two hydrolyzable groups in its molecule.

This invention also provides a process for producing an expandable styrene series resin composition comprising a styrene series resin containing in its molecular structure one or more groups of the formula:

$$-\text{SiY}_n\text{R}_{3-n} \qquad (I)$$

wherein R is an inert monovalent organic group; Y is a hydrolyzable group; and n is an integer of 1 to 3, and a blowing agent, which comprises suspension polymerizing at least one styrene series monomer and at least one vinyl series monomer other than the styrene series monomer containing a compound of the formula:

$$\text{XSiY}_n\text{R}_{3-n} \qquad (II)$$

wherein X is an organic group having at least one copolymerizable double bond; and Y, R and n are as defined above, in an aqueous medium to give a styrene series resin, and impregnating the styrene series resin with a blowing agent during or after the completion of the polymerization to give the expandable styrene series resin composition in the form of beads or particles.

This invention further provides a process for producing an expandable styrene series resin composition comprising a styrene series resin containing in its molecular structure a group of the formula:

$$-\text{SiY}_n\text{R}_{3-n} \qquad (I)$$

wherein R is an inert monovalent organic group; Y is a hydrolyzable group; and n is an integer of 1 to 3, and a blowing agent, which comprises conducting suspension polymerization in an aqueous medium a polymer solution comprising at least one styrene series polymer and at least one styrene series monomer and/or vinyl series monomer, wherein a compound of the formula:

$$\text{XSiY}_n\text{R}_{3-n} \qquad (II)$$

wherein X is an organic group having at least one copolymerizable double bond; and Y, R and n are as defined above, is included as a part of the component constituting said styrene series polymer and/or as a part of said vinyl series monomer, and impregnating the resulting styrene series resin with a blowing agent during or after the completion of the polymerization to give the expandable styrene series resin composition in the form of beads or particles.

In this invention, the term "styrene series resin" includes homopolymer or copolymers of styrene series monomers, and copolymers of a styrene series monomer with another one or more vinyl series monomers. The styrene series resins can be used alone or as a mixture thereof.

The styrene series monomers include styrene, and substituted styrenes such as α-methylstyrene, vinyltoluene, chlorostyrene, tert-butylstyrene and the like. These styrene series monomers can be used alone or a mixture thereof. A small amount of divinylbenzene can be used together with the styrene series monomer or monomers.

The term "vinyl series monomers" means those other than the above-mentioned styrene series monomers, and includes, for example, cyanized vinyl compounds such as acrylonitrile; acrylic acid esters such as methyl acrylate, ethyl acrelate, butyl acrylate, hydroxyethyl acrylate, etc.; methacryric acid esters such as methyl methacrylate, ethyl methacrylate, butyl methacrylate, hydroxyethyl methacrylate, etc.; unsaturated carboxylic acid anhydrides and their mono- or dialkyl esters such as maleic anhydride; a compound of the formula (II) mentioned above; vinyl acetate, vinyl chloride; acrylic acid, methacrylic acid, and the like. These vinyl series monomers can be used alone or as a mixture of two or more of them. Considering the degree of expansion, melt-sticking of molded articles, surface appearance of molded articles, and manufacturing cycles, it is preferable to use a styrene series resin wherein the content of styrene or its substituted derivatives is 50% by weight or more.

The styrene series resin should contain the group of the formula (I) chemically bonded in its molecular structure. The group of the formula (I) is preferably contained in the styrene series resin in an amount of 0.03 to 20% by weight, more preferably 0.05 to 10% by weight in its molecular structure. If the amount is too small such as less than 0.03% by weight, heat resistance of foamed articles is not improved, while if the amount is too large such as more than 20% by weight, the degree of expansion is decreased remarkably to make the foam molding by steam difficult. In order to obtain the same properties in foaming performance and foam moldability as the conventional expandable polystyrenes and to improve heat resistance of foamed articles, it is preferable to use a styrene series resin containing the group of the formula (I) in an amount of 0.03, preferably 0.05 to 5% by weight in its molecular structure. It is more preferable to use a styrene series resin containing the group of the formula (I) in an amount of 5 to 20% by weight in its molecular structure in order to improve remarkably heat resistance and solvent resistance although foaming performance and foaming moldability may be decreased slightly.

In the formula (I), preferable examples of the hydrolyzable group Y are an alkoxy group having 1 to 6 carbon atoms such as methoxy, ethoxy, butoxy, etc.; an acyloxy group having 1 to 6 carbon atoms such as formyloxy, acetoxy, propyleneoxy, etc.; a hydroxyimino group having 1 to 14 carbon atoms such as $-ON=C(CH_3)_2$, $-ON=C(CH_3)C_2H_5$, $-ON=C(C_6H_5)_2$, etc.; an alkylamino or arylamino group such as $-NHCH_2$, $-NHC_2H_5$, $-NH(C_6H_5)$, etc. When n is 2 or 3, the substituents represented by the symbol Y may be the same or different.

Examples of the inert monovalent organic group R are a hydrocarbon group having 1 to 18 carbon atoms, preferably an alkyl group such as methyl, ethyl, propyl, butyl, tetradecyl, octadecyl, etc., an aryl group, an aralkyl group, an alkaryl group, for example, a phenyl group, a naphtyl group, a benzyl group, a tolyl group, a xylyl group, and the like.

As to a method for introducing the group of the formula (I) into the styrene series resin, the following methods can be employed.

(1) In the case of polymerization of one or more styrene series monomers or styrene series monomers and other one or more monomers such as vinyl series monomers, a compound of the formula:

wherein X, Y, R and n are as defined above, is copolymerized as a vinyl series monomer with a styrene series monomer. As the polymerization method, there can be used suspension polymerization, bulk polymerization, solution polymerization, and the like.

In the formula (II), the copolymerizable double bond-containing group X mentioned above includes, for example, an alkenyl group having preferably 2 to 6 carbon atoms such as a vinyl group, an allyl group, a butenyl group, etc.; a cycloalkeyl group such as cyclohexenyl group, a cyclopentadienyl group, a cyclohexadienyl group, etc.; an unsaturated acyloxyalkyl group such as a γ-methacryloxypropyl group, etc.; an unsaturated acyloxyalkoxy group such as a γ-methacryloxyethylpropyl ether group; a group of the formula: $CH_2=C(CH_3)COO(CH_2)_2OCH_2CH(OH)CH_2O(CH_2)_2-$, etc. Among these groups, the unsaturated acyloxyalkyl group such as a γ-methacryloxypropyl group and the unsaturated acryloxyalkoxy group such as a γ-methacryloxypropyl ether group are most preferred.

Among the compounds of the formula (II), preferable ones are compounds of the formula:

wherein X' is the same alkenyl group or unsaturated acyloxyalkyl group as defined in the X mentioned above; and Y' is the same alkoxy group as defined in the Y mentioned above.

Examples of preferable organosilane compounds of the formula (II) are γ-methacryloxypropyltrimethoxysilane, γ-methacryloxypropyltriethoxysilane, γ-methacryloxyethylpropyl ether trimethoxysilane, $CH_2=C(CH_3)COO(CH_2)_2OCH_2CH(OH)CH_2O(CH_2)_2Si(OCH_3)_3$.

Examples of preferable polymerization initiators are organic peroxides such as benzoyl peroxide, dichlorobenzoyl peroxide, dicumyl peroxide, di-tert-butyl peroxide, 2,5-di(peroxybenzoate)-hexyne-3, 1,3-bis(tert-butylperoxyisopropyl)-benzene, lauroyl peroxide, tert-butyl peracetate, 2,5-dimethyl-2,5-di(tert-butylperoxy)-hexyne-3, 2,5-dimethyl-2,5-di(tert-butylperoxy) hexane, tert-butyl perbenzoate, methyl ethyl ketone peroxide, methylcyclohexanone peroxide, and the like; azo series compounds such as azobisisobutyronitrile, dimethyl azodiisobutyrate, and the like. These polymerization initiators can be used alone or as a mixture thereof. The amount of the polymerization initiator depends on the kind of vinyl series monomer used and the molecular weight of the subjected polymer and is preferably 0.1 to 4% by weight based on the total weight of the styrene series monomer and vinyl series monomer.

When the reaction is conducted by suspension polymerization using an aqueous medium, there can be added a dispersing agent such as a hardly soluble phosphate, a water-soluble high polymer protective colloid, and the like to the polymerization system.

Examples of the hardly soluble phosphates are tricalcium phosphate, magnesium phosphate, etc. It is preferable to use a hardly soluble phosphate in an amount of 0.01% by weight or more based on the total amounts of the materials present in the polymerization system.

Examples of the water-soluble high polymer protective colloids are poly(vinyl alcohol), water-soluble cellulose derivatives such as alkyl cellulose, hydroxyalkyl cellulose, carboxyalkyl cellulose, etc., sodium polyacrylate, and the like. It is preferable to use a water-soluble high polymer protective colloid in an amount of 1 to 0.001% by weight based on the total amounts of the materials present in the polymerization system.

In addition, it is also possible to add one or more anionic surface active agent, water-soluble inorganic salts, and the like.

When the polymerization is carried out by solution polymerization, there can be used an organic solvent such as xylene, toluene, or the like conventionally used organic solvent.

(2) At least one styrene series resin, which has no group represented by the formula (I) but is produced in the same manner as mentioned in above (1), and at least one compound of the formula (II) are mechanically treated, for example, by strong milling, kneading accompanying shearing, cutting, or the like so as to react free radicals generated in the styrene series resin with the double bonds in the compound of the formula (II). Further, a styrene series resin can be treated so as to generate free radicals, to which a compound of the formula (II) can be grafted.

(3) At least one compound of the formula:

$$X''SiY_nR_{3-n} \quad (IV)$$

wherein $X''$ is a group reactive with such a functional group as a carboxyl group, a hydroxyl group, an amide group, an epoxy group or the like, (e.g., an epoxy group, an amino group, etc.); and Y, R and n are as defined above, is grafted on a styrene series resin having functional groups such as a carboxyl group, a hydroxyl group, an amide group, an epoxy group and the like (e.g., a styrene-maleic anhydride copolymer, a styrene-methacrylic acid copolymer, a styrene-β-hydroxymethacrylate copolymer, a styrene-acrylamide copolymer, etc.).

Examples of the compounds of the formula (IV) are γ-glycidoxypropyltrimethoxysilane

N-β-(aminoethyl)-γ-aminopropyltrimethoxysilane $(H_2NC_2H_4NHC_3H_6Si(OCH_3)_3)$, γ-aminopropyltriethoxysilane $(H_2NC_3H_6Si(OC_2H_5)_3)$, etc.

The reaction can be carried out, for example, by adding γ-glycidoxypropyltrimethoxysilane to a styrene-methacrylic acid copolymer in a high-boiling solvent such as toluene, xylene or the like, and heating at 80° C. or higher (and not higher than a boiling point of the solvent used) with stirring.

(4) Polystyrene or styrene series copolymer particles are suspended in water, heated with stirring and reacted with one or more styrene series monomers, other copolymerizable monomers, compounds of the formula (II) in the presence of polymerization catalyst to introduce groups of the formula (I) into the polymer. In this case, techniques described in above (1) can be applied.

(5) A styrene series resin having groups of the formula (I) obtained by the process of above (1) is dissolved in a styrene series monomer and polymerization is carried out by suspension, bulk, solution or the like technique to produce a polymer. The polymerization can be carried out in the same manner as described in above (1).

The expandable styrene series resin composition in the form of beads or particles can be produced by suspension polymerizing at least one styrene series monomer and at least one vinyl series monomer containing a compound of the formula (II) in an aqueous medium to give a styrene series resin, which is impregnated with a blowing agent during or after the completion of the polymerization.

The polymerization can preferably be carried out at a temperature of about 50° C. to the boiling point of the aqueous medium such as water.

The amount of the compound of the formula (II) is controlled so as to make the amount of the group of the formula (I) in the styrene series resin preferably 0.03 to 20% by weight, more preferably 0.05 to 10% by weight. The compound of the formula (II) can be added to the polymerization system at any time during the polymerization or before the polymerization. Or, to styrene series polymer particles suspended in an aqueous medium, one or more vinyl series monomers including one or more compounds of the formula (II) can be added.

The expandable styrene series resin composition in the form of beads or particles can also be produced by conducting suspension polymerization in an aqueous medium a polymer solution comprising at least one styrene series polymer and at least one vinyl series monomer, a compound of the formula (II) being included as a part of component constituting said styrene series polymer and/or as a part of said vinyl series monomer, and impregnating the resulting styrene series resin with a blowing agent during or after the completion of the polymerization. In this case, the amount of the group of the formula (I) in the styrene series resin can be adjusted preferably in the range of 0.03 to 20% by weight by controlling the adding amount of the compound of the formula (II). Further, it is preferable to select a mixing ratio of the styrene series polymer (A) to the vinyl series monomer (B) in the range of (A)/(B)=5/95 to 60/40 (weight ratio). When the mixing ration is outside the above-mentioned range, there is a tendency to make the stable suspension of the polymer solution in the aqueous medium difficult.

The polymer solution can be obtained by bulk polymerizing one or more styrene series monomers and one or more vinyl series monomers containing at least one compound of the formula (II) to a conversion of 5 to 60% by weight, preferably 10 to 50% by weight. The resulting polymer solution is then subjected to suspension polymerization in an aqueous medium.

Suspension polymerization conditions mentioned in above item (1) can also be applied to this suspension polymerization.

According to the above-mentioned processes, the expandable styrene series resion composition of this invention can preferably be obtained in the form of beads or particles.

The blowing agent usable in this invention is one which has a lower boiling point than the softening point of the styrene series resin, the other component of the composition of this invention, and is not soluble in or slightly soluble in the styrene series resin. Examples of such a blowing agent are aliphatic hydrocarbons such as propane, butane, pentane, etc.; alicyclic hydrocarbons such as cyclobutane, cyclopentane, etc.; and halogenated hydrocarbons such as methyl chloride, dichlorodifluoromethane, trichloromethane, trichloroethane, trichloroethylene, etc. The blowing agent, singly or as a mixture thereof, can preferably be used in an amount of 1 to 20% by weight based on the weight of the styrene series resin.

When propane and/or butane are used as blowing agent, it is preferable to use a small amount of a solvent for polystyrene or a styrene series copolymer. Examples of such a solvent are ethylene dichloride, trichloroethylene, tetrachloroethylene, benzene, toluene, xylene, ethylbenzene, etc.

The organosilane compound having at least two hydrolyzable groups, said organosilane compound being able to be added to the composition of this invention if required, can be represented by the formula:

$$Y_nSiR'_{4-n} \quad (V)$$

wherein Y is as defined above; R' is a monovalent organic group such as an alkyl group having 1 to 18 carbon atoms, an aryl group, an aralkyl group, an alkanol group, or the like, or a copolymerizable double bond-containing group such as an alkenyl group having preferably 2 to 6 carbon atoms, a cycloalkenyl group, an unsaturated acyloxyalkyl group, an unsaturated acyloxyalkoxy group, a group of the formula: $CH_2=C(CH_3)COO(CH_2)_2OCH_2CH(OH)CH_2O(CH_2)_2-$, or the like and R' has preferably the same meaning as R as defined in the formula (I); and n is an integer of 2 to 4. The compound of the formula (V) can preferably be used in an amount of 20% by weight or lower based on the weight of the styrene series resin. The compound of the formula (V) is effective for auxiliarily improving heat resistance of the resulting expandable styrene series resin composition. Examples of the compounds of the formula (V) are methyl silicate, ethyl silicate, propyl silicate, methyltrimethoxysilane, ethyltrimethoxysilane, methyltrimethoxysilane, ethyltrimethoxysilane, methyltriethoxysilane, methylethyldimethyoxysilane, methylethyldiethoxysilane, octyltriethoxysilane, and the like.

As for impregnating methods of the styrene series resin having groups of the formula (I) with a blowing agent, there may be used a method of impregnating the styrene series resin particles (obtained by suspension polymerization) or pellets suspended in an aqueous medium with a blowing agent by compression, a method of kneading the above-mentioned styrene series resin with a blowing agent, a method of dipping the above-mentioned styrene series resin in a blowing agent (in liquid state), and the like. Further, a blowing agent may be impregnated into the above-mentioned styrene series resin by compression during the suspension polymerization, preferably after the conversion becomes 50% by weight or more.

The compound of the formula (V) having at least two hydrolizable groups can be mixed with the styrene series resin at the time of impregnation with the blowing agent together with the blowing agent after the polymerization or during the polymerization or can be mixed with the styrene series resin separately during the polymerization or after the polymerization, followed by the impregnation with the blowing agent, or vice versa.

The expandable styrene series resin composition of this invention may contain one or more other conventional additives such as pigments, fire retardants, antioxidants, antistatic agents, etc.

Foaming of the expandable styrene series resin composition of this invention can be carried out with heating and/or under reduced pressure. Any conventional methods of foaming and expansion molding of styrene series resins widely used industrially can be applied to the composition of this invention. For example, when the resin is in the form of particles, these particles are provisionally foamed by steam, followed by steam foaming in a molding machine to give foamed products. Further, foamed articles can also be produced by using an extrusion foaming machine.

Degree of expansion of the expandable styrene series resin composition can be selected optionally from low degrees to high degrees.

The foamed articles obtained from the expandable styrene series resin composition have excellent heat resistance. The reason for it seems to be that the group of the formula (I) chemically bonded to the polymer or the organosilane compound of the formula (V) dispersed in said group of the formula (I) and the styrene series resin causes cross-linking reaction with heating for giving gelled polymer. This cross-linking reaction hardly proceeds in the stage of ordinary foam molding. Therefore, inhibition of foaming due to the cross-linking does not take place, thus the production of highly foamed articles becomes easy. This is one of the most important features of the composition of this invention.

In order to strengthen this feature, it is preferable to treat the expandable styrene series resin composition of this invention with water or steam before molding or to conduct steam molding.

The cross-linking reaction proceeding in foamed articles depends on a temperature. The cross-linking reaction gradually proceeds at a temperature below 100° C., while proceeding rapidly above 100° C. depending on the temperature. Therefore, the resulting molded articles do not require special treatment for imparting heat resistance but become heat resistant depending on use conditions. But in some cases, the molded articles are preferably subjected to heat treatment (sometimes by treatment with water or steam, followed by heat treatment) before use depending on purposes of uses. In any cases, heat resistance of foamed articles produced from the expandable styrene series resin composition of this invention is superior to that of foamed articles obtained from conventional expandable styrene series resin, although there are differences depending on degrees of expansion. In addition, when the foamed articles are heat treated, solvent resistance of the resulting articles is also remarkably improved.

In summary, the expandable styrene series resin composition of this invention has the following features:

(a) A foam molding method of using steam conventionally employed can be applied to the composition of this invention.

(b) Foamed articles can be worked by using a conventional method after molding.

(c) When foamed articles are heated at high temperatures naturally or compulsorily, there takes place no shrinakge unlike conventional foamed articles.

(d) When foamed articles are subjected to heat treatment, they are excellent in resistance to thermal deformation and solvent resistance.

(e) The expandable styrene series resin composition particularly in the form of beads or particles immediately after the production can give foamed articles having a sufficient number of cells in uniform even if it is provisionally foamed without aging, followed by foam molding. Therefore, a special treatment or operation for adjusting cells during or after the polymerization is not particularly necessary.

The expandable styrene series resin composition of this invention, particularly that in the form of beads or particles, is suitable for producing foamed articles having excellent heat resistance such as new heat insulating materials, e.g., heat insulating materials for hot water supply tanks, heat insulating materials for apparatus using solar energy, underlying materials for metallic roofing-tiles, lagging materials for feeding containers, heat insulating materials for cars and ships, hot water pipe lagging covers, air-conditoiner wind tunnels, sizing boards, car structural materials, metallic simultaneous molding panels, etc.

This invention is illustrated by way of the following Examples, in which all parts and percents are by weight unless otherwise specified.

EXAMPLE 1

In a 4-liter autoclave equipped with a rotating stirrer, 1500 g (100 parts) of demineralized water, 2.25 g (0.15 part) of basic calcium phosphate, 0.045 g (0.003 part) of sodium dodecylbenzenesulfonate and 0.15 g (0.01 part) of sodium sulfate were placed and dispersed uniformly. Then, a solution obtained by dissolving 7.5 g (0.5 part) of γ-methacryloxypropyltrimethoxysilane in 1500 g (100 parts) of styrene, followed by dissolving of 3.75 g (0.25 part) of benzoyl peroxide and 1.5 g (0.10 part) of tert-butyl perbenzoate, was added to the autoclave. After raising the temperature to 90° C. with stirring, polymerization was started. After 3 hours from the beginning of the polymerization, 1.5 g (0.10 part) of basic calcium phosphate was added to the autoclave and the polymerization was continued for additional 5 hours. Subsequently, 15 g (1.0 part) of ethylbenzene was added to the autoclave and after 20 minutes, 158 g of butane gas (250 ml in the state of liquid, specific gravity 0.63) was pressed into the autoclave with nitrogen gas. After completion of supply of butane gas, the temperature was raised to 125° C. after 2 hours and then maintained at that temperature for 4 hours for the reaction, followed by cooling to 30° C. to take off superfluous gas from the system. After filtration and drying, expandable styrene series resin composition particles were obtained. The particles contained butane which is a blowing agent in 8.5%.

The particles having particle size of 1.68 to 0.84 mm obtained by sieving was provisionally foamed by steam to give provisionally foamed particles foamed 60 times in terms of bulk magnification. The provisionally foamed particles were filled in a mold to give a box having a size of 30 cm×30 cm×25 cm with 16 mm thick and molded under constant conditions under a vapor pressure of 0.8–1.2 kg/cm² for 5 minutes by using a steam molding machine to give a molded article having good surface appearance and good fusing (foamed beads being bonded compactly without forming vacant spaces). Using the molded article, heat resistance and solvent resistance tests were conducted. The results are as shown in Table 1.

EXAMPLE 2

The process of Example 1 was repeated except for using a solution obtained by dissoling 7.5 g (0.5 part) of γ-methacryloxypropyltrimethoxysilane and 7.5 g (0.5 part) of methyl silicate (Si(OCH₃)₄) in 1500 g (100 parts) of styrene.

The obtained molded article had good surface appearance and good fusing. Using the molded article, heat resistance and solvent resistance tests were conducted. The results are as shown in Table 1.

EXAMPLE 3

The process of Example 1 was repeated except for using a solution obtained by dissoling 30 g (2 parts) of metyl methacrylate and 7.5 g (0.5 part) of γ-methacryloxypropyltrimethoxysilane in 1470 g (98 parts) of styrene.

The obtained molded article had good surface appearance and good fusing. Using the molded article, heat resistance and solvent resistance tests were conducted. The results are as shown in Table 1.

EXAMPLE 4

The process of Example 1 was repeated except for using 15 g (1.0 part) of γ-methacryloxypropyltrimethoxysilane.

The obtained molded article had good surface appearance and good fusing. Using the molded article, heat resistance and solvent resistance tests were conducted. The results are as shown in Table 1.

EXAMPLE 5

In a 4-liter autoclave equipped with a rotating stirrer, 1500 g (100 parts) of demineralized water, 2.25 g (0.15 part) of basic calcium phosphate, 0.045 g (0.003 part) of sodium dodecylbenzenesulfonate and 0.15 g (0.01 part) of sodium sulfate were placed and dispersed uniformly. Then, a solution obtained by dissolving 15 g (1.0 part) of γ-methacryloxypropyltrimethoxysilane in 1500 g (100 parts) of styrene, followed by dissolving of 3.75 g (0.25 part) of benzoyl peroxide and 1.5 g (0.10 part) of tert-butyl perbenzoate, was added to the autoclave. After raising the temperature to 90° C. with stirring, polymerization was started. After 3 hours from the beginning of the polymerization, 1.5 g (0.10 part) of basic calcium phosphate was added to the autoclave and the polymerization was continued for additional 5 hours. After cooling, dehydrating and drying, 1200 g of styrene series polymer particles having particle size of 1.68 to 0.84 mm were obtained after classification.

In a 4-liter autoclave equipped with a stirrer, 1800 g of 0.4% aqueous solution of poly(vinyl alcohol) (GOHSENOL KH-20, a trade name, manufactured by Nippon Synthetic Chemical Industry Co., Ltd.), 1200 g (100 parts) of the above-mentioned polystyrene series polymer particles (or beads) and 12 g (1.0 part) of ethylbenzene were placed and the temperature was raised to 80° C. After 10 minutes of raising to 80° C., 200 ml (in the state of liquid) of butane gas was pressed into the autoclave with nitrogen gas. After completion of supply of butane gas, the temperature was raised again to 125° C. after 2 hours and then maintained at that temperature for 4 hours with stirring. Subsequently, the autoclave was cooled to 30° C. and superfluous gas in the system was removed. After filtration and drying, an expandable styrene series resin composition in the form of particles was obtained.

Using the resulting particles, a molded article was obtained according to Example 1. The obtained molded article had good surface appearance and good fusing. Using the molded article, heat resistance and solvent resistance tests were conducted. The results are as shown in Table 1.

EXAMPLE 6

The process of Example 5 was repeated except for not dissolving γ-methacryloxypropyltrimethoxysilane in styrene, commensing polymerization using styrene only and adding 15 g of γ-methacryloxypropyltrimethoxysilane to the suspension solution when the convention of styrene reached 30% by weight.

Using the resulting particles, a molded article was obtained according to Example 1. The obtained molded article had good surface appearance and good fusing. Using the molded article, heat resistance and solvent resistance tests were conducted. The results are as shown in Table 1.

EXAMPLE 7

The process of Example 5 was repeated except for not dissolving γ-methacryloxypropyltrimethoxysilane in styrene, commensing polymerization using styrene only and adding 15 g of γ-methacryloxypropyltrimethoxysilane to the suspension solution when the conversion of styrene reached 60% by weight.

Using the resulting particles, a molded article was obtained according to Example 1. The obtained molded article had good surface appearance and good fusing.

Using the molded article, heat resistance and solvent resistance tests were conducted. The results are as shown in Table 1.

EXAMPLE 8

In a 4-liter autoclave equipped with a rotating stirrer, 1500 g (100 parts) of demineralized water, 3.0 g (0.2 part) of basic calcium phosphate, 0.15 g (0.01 part) of sodium dodecylbenzenesulfonate, 4.5 g (0.3 part) of calcium carbonate and 1050 g (70 parts) of polystyrene particles (particle size 0.71–1.0 mm) were placed and stirred while raising the temperature in the system to 80° C. A solution obtained by dissolving 15 g (1.0 part) of γ-methacryloxypropyltrimethoxysilane in 420 g (30 parts) of styrene was added dropwise to the autoclave in an amount of 110 g each time for 3 times with an interval of each 20 minutes. To the remaining solution, 3.75 g (0.25 part) of benzoyl peroxide and 1.5 g (0.10 part) of tert-butyl perbenzoate were added and dissolved therein. After 30 minutes of the third supply of the solution, the resulting solution was added to the autoclave. After raising the temperature to 80° C., 250 ml (in the state of liquid, equal to 158 g) of butane gas was pressed into the autoclave with nitrogen gas. After completion of the supply of butane gas and an interval of 30 minutes, the temperature was raised again to 115° C. after 2 hours and then maintained at that temperature for 3 hours with stirring, followed by cooling to 30° C. to remove superfluous gas out of the system. After filtration and drying, an expandable styrene series resin composition in the form of particles was obtained.

Using the resulting particles, a molded article was obtained according to Example 1. The obtained molded article had good surface appearance and good fusing. Using the molded article, heat resistance and solvent resistance tests were conducted. The results are as shown in Table 1.

EXAMPLE 9

In a 4-liter four-necked flask, 1800 g (150 parts) of xylol was placed and heated to 100° C. with stirring while passing an inert gas therethrough. Subsequently, a mixed solution containing 1200 g (100 parts) of styrene, 15 g (1.25 parts) of azobisisobutyronitrile and 30 g (2.5 parts) of γ-methacryloxypropyltrimethoxysilane was added dropwise to the flask in 2 hours. After the dropwise addition, the reaction temperature was raised to 140° C. and the reaction was carried out for additional 3 hours to reach a final point. Subsequently the xylol used as a solvent was separated by distillation with heating. The resulting styrene series was pelletized by using a pelletizing machine. Then, in a 4-liter autoclave equipped with a rotating stirrer, 1500 g (50 parts) of demineralized water, 3.0 g (0.1 part) of basic calcium phosphate, 0.15 g (0.005 part) of sodium dodecylbenzenesulfonate, 4.5 g (0.15 part) of calcium carbonate and 1050 g (35 parts) of the above-mentioned pellets were placed and the temperature in the system was raised to 80° C. with stirring. After raising the temperature, 15 g (0.5 part) of ethylbenzene was added to the autoclave and 250 ml (in the state of liquid, equal to 158 g) of butane gas was pressed into the autoclave with nitrogen gas. After completion of the supply of butane gas and an interval of 30 minutes, the temperature was raised again to 115° C. after 2 hours and then maintained at that temperature for 3 hours with stirring, followed by cooling to 30° C. to remove superfluous gas out of the system. After filtration and drying, an expandable styrene series resin composition in the form of particles was obtained.

Using the resulting particles, a molded article was obtained according to Example 1. The obtained molded article had good surface appearance and good fusing. Using the molded article, heat resistance and solvent resistance tests were conducted. The results are as shown in Table 1.

Comparative Example 1

The process of Example 1 was repeated except for not using γ-methacryloxypropyltrimethoxysilane to give expandable polystyrene resin particles.

Using the same manner as described in Example 1, there was obtained a molded article having good surface appearance and good fusing. Using the molded article, heat resistance and solvent resistance tests were conducted. The results are as shown in Table 1.

Comparative Example 2

The process of Example 2 was repeated except for not using γ-methacryloxypropyltrimethoxysilane to give expandable polystyrene resin particles.

Using the same manner as described in Example 1, there was obtained a molded article, which was subjected to heat resistance and solvent resistance tests. The results are as shown in Table 1.

Comparative Example 3

The process of Example 3 was repeated except for not using γ-methacryloxypropyltrimethoxysilane to give expandable polystyrene resin particles.

Using the same manner as described in Example 1, there was obtained a molded article, which was subjected to heat resistance and solvent resistance tests. The results are as shown in Table 1.

Comparative Example 4

The process of Example 5 was repeated except for not using γ-methacryloxypropyltrimethoxysilane to give expandable polystyrene resin particles.

Using the same manner as described in Example 1, there was obtained a molded article, which was subjected to heat resistance and solvent resistance tests. The results are as shown in Table 1.

Comparative Example 5

The process of Example 7 was repeated except for not using γ-methacryloxypropyltrimethoxysilane to give expandable polystyrene resin particles.

Using the same manner as described in Example 1, there was obtained a molded article, which was subjected to heat resistance and solvent resistance tests. The results are as shown in Table 1.

Comparative Example 6

The process of Example 8 was repeated except for not using γ-methacryloxypropyltrimethoxysilane to give expandable polystyrene resin particles.

Using the same manner as described in Example 1, there was obtained a molded article, which was subjected to heat resistance and solvent resistance tests. The results are as shown in Table 1.

Comparative Example 7

The process of Example 9 was repeated except for not using γ-methacryloxypropyltrimethoxysilane to give expandable polystyrene resin particles.

Using the manner as described in Example 1, there was obtained a molded article, which was subjected to heat resistance and solvent resistance tests. The results are as shown in Table 1.

The heat resistance test and solvent resistance test were conducted in the following manners:

Heat Resistance Test

A molded article of 10 cm×10 cm×2.5 cm was allowed to stand in a constant temperature bath set at 125° C. for 4 hours. Then, volume shrinkage was obtained by calculating the following equation:

$$\text{Volume shrinkage} = \left(1 - \frac{\text{Volume after heat treatment}}{\text{Volume before heat treatment}}\right) \times 100 \, (\%)$$

Solvent Resistance Test

One gram of a molded article before and after the heat resistance test was heated in 200 ml of tetrahydrofran (THF) under reflux for 10 hours and nonsoluble material content was measured.

TABLE 1

| Sample | Shrinkage after heat resistance test (125° C. - 4 hrs) | Non-soluble material content in THF | | | |
|---|---|---|---|---|---|
| | | Before heat resistance test | After heat resistance test | Particles before provisional foaming | Provisionally foamed particles before molding |
| Example | | | | | |
| 1 | | | 30% | | |
| 2 | | | 30 | | |
| 3 | less than 5% | 0% (Completely soluble) | 30 | less than 1% | less than 1% |
| 4 | | | >80 | | |
| 5 | | | >80 | | |
| 6 | | | >80 | | |
| 7 | | | >80 | | |
| 8 | | | >80 | | |
| 9 | | | >95 | | |
| Comparative Example | | | | | |
| 1 | | | | | |
| 2 | | | | | |
| 3 | 80 | 0% (Completely soluble) | 0% (Completely soluble) | 0% (Completely soluble) | 0% (Completely soluble) |
| 4 | 80~90% | | | | |
| 5 | | | | | |
| 6 | | | | | |
| 7 | | | | | |

EXAMPLE 10

In a 4-liter autoclave equipped with a rotating stirrer, 1500 g (100 parts) of demineralized water, and 4.5 g (0.3 part) of poly(vinyl alcohol) (W-24, manufactured by Denki Kagaku Kogyo K.K.) were placed and dispersed uniformly, followed by addition of a mixed solution obtained by dissolving first 225 g (15 parts) of $\gamma$-methacryloxypropyltrimethoxysilane in 1500 g (100 parts) of styrene and dissolving secondly 3.75 g (0.25 part) of benzoyl peroxide and 1.5 g (0.10 part) of tert-butyl perbenzoate. The temperature was raised to 90° C. with stirring and polymerization was started. The polymerization was continued for 5 hours while maintaining the temperature at 90° C. Subsequently, 15 g (1.0 part) of ethylbenzene was added to the autoclave and after 20 minutes, 250 ml (in the state of liquid, equal to 158 g) of butane gas was pressed into the autoclave with nitrogen gas. After completion of the supply of butane gas, the temperature was raised again to 125° C. after 2 hours and the reaction was continued for 4 hours at that temperature. Then the autoclave was cooled to 30° C. to remove superfluous gas out of the system. After filtration and drying, an expandable styrene series resin composition was obtained in the form of particles. The particles contained butane which is a blowing agent in 8.5%.

The particles having particle size of 1.68 to 0.84 mm obtained by sieving was provisionally foamed by stem to give provisionally foamed particles foamed 20 times in terms of bulk magnification. A molded article was obtained in the same manner as described in Example 1. Using the molded article, heat resistance and solvent resistance tests were conducted. The results are as shown in Table 2.

EXAMPLE 11

The process of Example 10 was repeated except for dissolving 225 g (15 parts) of $\gamma$-methacryloxypropyltrimethoxysilane and 75 g (5 parts) of methyl silicate (Si(OCH$_3$)$_4$) in 1500 g (100 parts) of styrene.

Using the obtained molded article, heat resistance and solvent resistance tests were conducted. The results are as shown in Table 2.

EXAMPLE 12

The process of Example 10 was repeated except for dissolving 30 g (2 paets) of methyl methacrylate and 225 g (15 parts) of $\gamma$-methacryloxypropyltrimethoxysilane in 1470 g (98 parts) of styrene.

Using the obtained molded article, heat resistance and solvent resistance tests were conducted. The results are as shown in Table 2.

EXAMPLE 13

The process of Example 10 was repeated except for not dissolving $\gamma$-methacryloxypropyltrimethoxsilane in styrene, commensing polymerization using styrene only and adding 225 g of $\gamma$-methacryloxypropyltrimethoxysilane to the suspension solution when the conversion of styrene reached 30% by weight.

Using the resulting particles, a molded article was obtained in the same manner as described in Example 10. Using the molded article, heat resistance and solvent resistance tests were conducted. The results are as shown in Table 2.

EXAMPLE 14

In a 4-liter autoclave equipped with a rotating stirrer, 1500 g (100 parts) of demineralized water, 4.5 g (0.3 part) of poly(vinyl alcohol) (W-24, manufactured by Denki Kagaku Kogyo K.K) and 1050 g (70 parts) of polystyrene particles (particle size 0.71–1.0 mm) were placed and stirred while raising the temperature in the system to 80° C. A solution obtained by dissolving 225 g (15 parts) of γ-methacryloxypropyltrimethoxysilane in 420 g (30 parts) of styrene was added dropwise to the autoclave in an amount of 215 g each time for 3 times with an interval of each 20 minutes. To the remaining solution, 3.75 g (0.25 part) of benzoyl peroxide and 1.5 g (0.10 part) of tert-butyl perbenzoate were added and dissolved therein. After 30 minutes of the third supply of the solution, the resulting solution was added to the autoclave in the same manner as mentioned above. The reaction was continued for additional 3 hours, followed by cooling to obtain vinyl series polymer particles having almost uniform particle size. To the resulting particles, 15 g (1.0 part) of ethylbenzene was added and the temperature was raised to 80° C. Subsequently, 250 ml (in the state of liquid, equal to 158 g) of butane gas was pressed into the autoclave with nitrogen gas. After completion of the supply of butane gas and an interval of 30 minutes, the temperature was raised again to 115° C. after 2 hours and then maintained at that temperature for 3 hours with stirring, followed by cooling to 30° C. to remove superfluous gas out of the system. After filtration and drying, an expandable styrene series resin composition in the form of particles was obtained.

Using the resulting particles, a molded article was obtained according to Example 10. The obtained molded article had good surface appearance and good fusing. Using the molded article, heat resistance and solvent resistance tests were conducted. The results are as shown in Table 2.

EXAMPLE 15

In a 4-liter four-necked flask, 1800 g (150 parts) of xylol was placed and heated to 100° C. with stirring while passing an inert gas therethrough. Subsequently, a mixed solution containing 1200 g (100 parts) of styrene, 15 g (1.25 parts) of azobisisobutyronitrile and 180 g (15 parts) of γ-methacryloxypropyltrimethoxysilane was added dropwise to the flask in 2 hours. After the dropwise addition, the reaction temperature was raised to 140° C. and the reaction was carried out for additional 3 hours to reach a final point. Subsequently the xylol used as a solvent was separated by distillation with heating. The resulting styrene series resin was pelletized by using a pelletizing machine. Then, in a 4-liter autoclave equipped with a rotating stirrer, 1500 g (50 parts) of demineralized water, 3.0 g (0.1 part) of basic calcium phosphate, 0.15 g (0.005 part) of sodium dodecylbenzenesulfonate, 4.5 g (0.15 part) of calcium carbonate and 1050 g (35 parts) of the above-mentioned pellets were placed and the temperature in the system was raised to 80° C. with stirring. After raising the temperature, 15 g (0.5 part) of ethylbenzene was added to the autoclave and 250 ml (in the state of liquid, equal to 158 g) of butane gas was pressed into the autoclave with nitrogen gas. After completion of the supply of butane gas and an interval of 30 minutes, the temperature was raised again to 115° C. after 2 hours and then maintained at that temperature for 3 hours with stirring, followed by cooling to 30° C. to remove serperfluous gas out of the system. After filtration and drying, an expandable styrene series resin composition in the form of particles was obtained.

Using the resulting particles, a molded article was obtained according to Example 10. The obtained molded article had good surface appearance and good fusing. Using the molded article, heat resistance and solvent resistance tests were conducted. The results are as shown in Table 2.

Comparative Example 8

The process of Example 10 was repeated except for not using γ-methacryloxypropyltrimethoxysilane to give expandable polystyrene resin particles.

Using the same manner as described in Example 1, there was obtained a molded article, which was subjected to heat resistance and solvent resistance tests. The results are as shown in Table 2.

Comparative Example 9

The process of Example 11 was repeated except for not using γ-methacryloxypropyltrimethoxysilane to give expandable polystyrene resin particles.

Using the same manner as describd in Example 1, there was obtained a molded article, which was subjected to heat resistance and solvent resistance tests. The results are as shown in Table 2.

Comparative Example 10

The process of Example 12 was repeated except for not using γ-methacryloxypropyltrimethoxysilane to give expandable polystyrene resin particles.

Using the same manner as described in Example 10, there was obtained a molded article, which was subjected to heat resistance and solvent resistance tests. The results are as shown in Table 2.

Comparative Example 11

The process of Example 14 was repeated except for not using γ-methacryloxypropyltrimethoxysilane to give expandable polystyrene resin particles.

Using the same manner as described in Example 1, there was obtained a molded article, which was subjected to heat resistance and solvent resistance tests. The results are as shown in Table 2.

Comparative Example 12

The process of Example 15 was repeated except for not using γ-methacryloxypropyltrimethoxysilane to give expandable polystyrene resin particles.

Using the same manner as described in Example 1, there was obtained a molded article, which was subjected to heat resistance and solvent resistance tests. The results are as shown in Table 2.

TABLE 2

| Sample | Shrinkage after heat resistance test (125° C. - 4 hrs) | Non-soluble material content in THF | |
|---|---|---|---|
| | | Before heat resistance test | after heat resistance test |
| Example 10 | less than 2% | 30% | 90 |
| 11 | | 40 | 95 |
| 12 | | 30 | 90 |
| 13 | | 30 | 90 |
| 14 | | 30 | 90 |

TABLE 2-continued

| Sample | Shrinkage after heat resistance test (125° C. - 4 hrs) | Non-soluble material content in THF | |
|---|---|---|---|
| | | Before heat resistance test | after heat resistance test |
| 15 Comparative Example 8 | | 30 | 95 |
| 9 10 11 | 80–90% | 0% (Completely soluble) | 0% (Completely soluble) |

EXAMPLE 16

In a 4-liter autoclave equipped with a rotating stirrer, a solution obtained by dissolving 7.5 g of γ-methacryloxypropyltrimethoxysilane, 3.75 g of benzoyl peroxide and 1.5 g of tert-butyl perbenzoate in 1500 g of styrene was placed and heated to 90° C. with stirring to begin bulk polymerization. After 2 hours from the beginning of the polymerization (conversion 30% by weight), a uniformly dispersed suspension of 1500 g of demineralized water, 3.8 g of basic calcium phosphate and 0.045 g of sodium dodecylbenzenesulfonate was added to the system and suspension polymerization was conducted for additional 6 hours. Subsequently, 15 g of ethylbenzene was added to the system, and after 20 minutes, 250 ml (in the state of liquid, equal to 158 g) of butane gas was pressed into the autoclave with nitrogen gas. After completion of supply of butane gas, the temperature was raised to 125° C. after 2 hours and then maintained at that temperature for 4 hours for the reaction, followed by cooling to 30° C. to remove superfluous gas from the system. After filtration and drying, an expandable styrene series resin composition in the form of particles was obtained.

The particles having particle size of 1.68 to 0.84 mm obtained by sieving was provisionally foamed by steam to give provisionally foamed particles foamed 60 times in terms of bulk magnification. The provisionally foamed particles were filled in a mold and molded under the same constant conditions as in Example 1 by using a steam molding machine to give a molded article having good surface appearance and good fusing. When the molded article was heat treated in a constant temperature bath set at 125° C. for 4 hours, the volume shrinkage was less than 5%. The molded article after the above-mentioned heat treatment maintained elasticity as a foamed article.

EXAMPLE 17

The process of Example 16 was repeated except for using 15 g of γ-methacryloxypropyltrimethoxysilane.

When the resulting molded article was heat treated in a constant temperature bath set at 125° C. for 4 hours, the volume shrinkage was less than 2%. The molded article after the above-mentioned heat treatment maintained elasticity as a foamed article.

EXAMPLE 18

In a 4-liter autoclave equipped with a rotating stirrer, a solution of 1500 g of styrene, 15 g of γ-methacryloxypropyltrimethoxysilane, 3.75 g of benzoyl peroxide and 1.5 g of tert-butyl perbenzoate was placed and heated to 90° C. with stirring to begin polymerization. After 2.5 hours from the beginning of the polymerization (conversion 40% by weight), a uniformly dispersed suspension of 1500 g of demineralized water, 3.8 g of basic calcium phosphate and 0.045 g of sodium dodecylbenzenesulfonte was added to the system and suspension polymerization was conducted for additional 5.5 hours. After cooling, dehydration and drying, 1200 g of vinyl series polymer particles having particle size of 1.68 to 0.84 mm after classification were obtained.

Then, in a 4-liter autoclave equipped with a rotating stirrer, 1800 g of 0.4% aqueous solution of poly(vinyl alcohol) (GOHSENOL KH-20, a trade name, manufactured by Nippon Synthetic Chemical Industry Co., Ltd.) and 12 g of ethylbenzene were placed and heated to 80° C. After heated to 80° C. and an interval of 10 minutes, 200 ml (in the state of liquid) of butane gas was pressed into the autoclave with nitrogen gas. After completion of supply of butane gas, the temperature was raised to 125° C. after 2 hours and then maintained at that temperature for 4 hours for the reaction with stirring, followed by cooling to 30° C. to remove superfluous gas from the system. After filtration and drying, an expandable styrene series resin composition in the form of particles was obtained. The polymer particles had the same properties as those obtained in Example 16.

Using these expandable styrene series resin particles, a molded article was obtained in the same manner as described in Example 16. The molded article had good surface appearance and good fusing. When the molded article was heat treated in a constant temperature bath set at 125° C. for 4 hours, the volume shrinkage was less than 2%. The molded article after the above-mentioned heat treatment maintained elasticity as a foamed article.

EXAMPLE 19

The process of Example 18 was repeated except for not dissolving γ-methacyloxypropyltrimethoxysilane in styrene, commensing polymerization using styrene only and adding 15 g of γ-methacryloxypropyltrimethoxysilane to the system at a time of conversion of styrene 30% (after 2.0 hours from the beginning of the polymerization), followed by suspension polymerization.

Using the resulting expandable styrene series resin particles, a molded article having good surface appearance and good fusing was obtained in the same manner as described in Example 16. When the molded article was heat treated in the same manner as described in Example 16, the volume shrinkage was less than 2%. The molded article after the above-mentioned heat treatment maintained elasticity as a foamed article.

EXAMPLE 20

The process of Example 16 was repeated except for using 75 g of γ-methacryloxypropyltrimethoxysilane.

Using the resulting expandable styrene series resin particles, a molded article having good surface appearance and good fusing was obtained in the same manner as described in Example 16. When the molded article was heat treated in the same manner as described in Example 16, the volume shrinkage was less than 0.5%. The molded article after the above-mentioned heat treatment maintained elasticity as a foamed article.

EXAMPLE 21

In a 4-liter autoclave equipped with a rotating stirrer, 450 g of polystyrene beads and 1000 g of styrene were placed and heated at about 50° C. to dissolve the polystyrene beads. Subsequently a solution obtained by dissolving 2.63 g of benzoyl peroxide and 1.05 g of tert-butyl perbenzoate in a mixed solution of 50 g of styrene and 15 g of γ-methacryloxypropyltrimethoxysilane was added to the autoclave in an amount of 4 liters with sufficient stirring. Further, a uniformly dispersed suspension of 1500 g of demineralized water, 3.8 g of basic calcium phosphate and 0.045 g of sodium dodecylbenzenesulfonate was added to the autoclave and the temperature was raised to 90° C. to start suspension polymerization. After reacting at 90° C. for 6 hours, 15 g of ethylbenzene was added to the autoclave. Further, after 20 minutes, 250 ml (in the state of liquid, equal to 158 g) of butane gas was pressed into the autoclave with nitrogen gas. The following procedure was the same as described in Example 16.

Using the resulting expandable styrene series resin particles, a molded article having good surface appearance and good fusing was obtained in the same manner as described in Example 16. When the molded article was heat treated in the same manner as described in Example 16, the volume shrinkage was less than 2%. The molded article after the above-mentioned heat treatment maintained elasticity as a foamed article.

EXAMPLE 22

In a 4-liter autoclave equipped with a rotating stirrer, 225 g of polystyrene beads and 1200 g of styrene were placed and heated at about 50° C. to dissolve the polystyrene beads. Subsequently a solution obtained by dissolving 3.19 g of benzoyl peroxide and 1.23 g of tert-butyl perbenzoate in a mixed solution of 75 g of styrene and 15 g of γ-methacryloxypropyltrimethoxysilane was added to the autoclave in an amount of 4 liters with sufficient stirring and heated to 90° C. to start polymerization. After 1.5 hours from the beginning of the polymerization, a uniformly dispersed suspension of 1500 g of demineralized water, 3.75 g of basic calcium phosphate and 0.045 g of sodium dodecylbenzenesulfonate was added to the autoclave and reacted at 90° C. for 6 hours. Then, 15 g of ethylbenzene was added to the autoclave. Further, after 20 minutes, 250 ml (in the state of liquid, equal to 158 g) of butane gas was pressed into the autoclave with nitrogen gas. The following procedure was the same as described in Example 16.

Using the resulting expandable styrene series resin particles, a molded article having good surface appearance and good fusing was obtained in the same manner as described in Example 16. When the molded article was heat treated in the same manner as described in Example 16, the volume shrinkage was less than 2%. The molded article after the above-mentioned heat treatment maintained elasticity as a foamed article.

Comparative Example 12

The process of Example 16 was repeated except for not using γ-methacryloxypropyltrimethoxysilane to give expandable polystyrene resin particles.

Using the resulting expandable styrene series resin particles, a molded article having good surface appearance and good fusing was obtained in the same manner as described in Example 16. When the molded article was heat treated in the same manner as described in Example 16, the volume shrinkage was 92%. The molded article after the above-mentioned heat treatment lost elasticity as a foamed article.

Comparative Example 13

The process of Example 18 was repeated except for not using γ-methacryloxypropyltrimethoxysilane to give expandable polystyrene resin particles.

Using the resulting expandable styrene series resin particles, a molded article having good surface appearance and good fusing was obtained in the same manner as described in Example 16. When the molded article was heat treated in the same manner as described in Example 16, the volume shrinkage was 92%. The molded article after the above-mentioned heat treatment lost elasticity as a foamed article.

Comparative Example 14

The process of Example 21 was repeated except for not using γ-methacryloxypropyltrimethoxysilane to give expandable polystyrene resin particles.

Using the resulting expandable styrene series resin particles, a molded article having good surface appearance and good fusing was obtained in the same manner as described in Example 16. When the molded article was heat treated in the same manner as described in Example 16, the volume shrinkage was 93%. The molded article after the above-mentioned heat treatment lost elasticity as a foamed article.

Comparative Example 15

The process of Example 22 was repeated except for not using γ-methacryloxypropyltrimethoxysilane to give expandable polystyrene resin particles.

Using the resulting expandable styrene series resin particles, a molded article having good surface appearance and good fusing was obtained in the same manner as described in Example 16. When the molded article was heat treated in the same manner as described in Example 16, the volume shrinkage was 93%. The molded article after the above-mentioned heat treatment lost elasticity as a foamed article.

Each 1 g of a sample was taken from the expandable styrene series resin particles, provisionally foamed particles, foam molded articles and foam molded articles after the heat treatment obtained in Examples 16 to 22 and Comparative Examples 12 to 15. Said sample was dipped in 100 ml of chloroform and extracted by using a Soxhlet's extractor for 10 hours. The results are as shown in Table 3.

As is clear from the results in Table 3, it seems that the heat treated molded articles are cross-linked, while the molded articles before heat treatment the provisionally foamed particles and the expandable styrene series resin particles are not cross-linked.

TABLE 3

| | Adding amount of organo-silane compound (parts) | Non-soluble material content (%) | | | |
| --- | --- | --- | --- | --- | --- |
| Sample | | Expandable styrene series resin particles | Provisionally foamed particles | Foam molded article | Foam molded article after heat treatment |
| Example | | | | | |
| 16 | 0.5 | <1 | <1 | <1 | 30 |
| 17 | 1.0 | <1 | <1 | <1 | >80 |
| 18 | 1.0 | <1 | <1 | <1 | >80 |
| 19 | 1.0 | <1 | <1 | <1 | >80 |
| 20 | 5.0 | <1 | <1 | <1 | >95 |
| 21 | 1.0 | <1 | <1 | <1 | >80 |
| 22 | 1.0 | <1 | <1 | <1 | >80 |
| Comparative | | | | | |

TABLE 3-continued

| Sample | Adding amount of organo-silane compound (parts) | Non-soluble material content (%) | | | |
|---|---|---|---|---|---|
| | | Expandable styrene series resin particles | Provisionally foamed particles | Foam molded article | Foam molded article after heat treatment |
| Example | | | | | |
| 12 | 0 | 0 | 0 | 0 | 0 |
| 13 | 0 | 0 | 0 | 0 | 0 |
| 14 | 0 | 0 | 0 | 0 | 0 |
| 15 | 0 | 0 | 0 | 0 | 0 |

What is claimed is:

1. An expandable styrene series resin composition comprising a styrene series resin containing in its molecular structure one or more groups of the formula:

$$-SiY_nR_{3-n} \qquad (I)$$

wherein R is an inert monovalent organic group; Y is a hydrolyzable group; and n is an integer of 1 to 3, and a blowing agent, said group or groups being chemically bonded to the molecular structure of the styrene series resin by addition polymerization, by graft polymerization or by free radicals.

2. A composition according to claim 1, which further comprises one or more organosilane compounds having at least two hydrolyzable groups in its molecule.

3. A composition according to claim 1 or 2, wherein the group of the formula (I) is contained in the styrene series resin in an amount of 0.03 to 20% by weight.

4. A composition according to claim 1 or 2, wherein the group of the formula (I) is contained in the styrene series resin in an amount of 0.05 to 10% by weight.

5. A composition according to claim 1 or 2, wherein the group of the formula (I) is contained in the styrene series resin in an amount of 0.05 to 5% by weight.

6. A composition according to claim 1 or 2, wherein in the formula (I) Y is an alkoxy group or an acyloxy group and R is an alkyl group or an aryl group.

7. A composition according to claim 1 or 2, wherein the composition is in the form of beads or particles.

8. A composition according to claim 2, wherein the organosilane compound having at least two hydrolyzable groups is represented by the formula:

$$Y_nSiR'_{4-n}$$

wherein Y is a hydrolyzable group; R' is a monovalent organic group; and n is an integer of 2 to 4.

9. A composition according to claim 1 or 2, wherein the styrene series resin is in the form of beads or particles and is produced by polymerizing at least one styrene series monomer and at least one vinyl series monomer containing a compound of the formula:

$$XSiY_nR_{3-n} \qquad (II)$$

wherein X is an organic group having at least one copolymerizable double bond; Y is a hydrolyzable group; R is an inert monovalent organic group; and n is an integer of 1 to 3, in an aqueous medium.

10. A composition according to claim 9, wherein the compound of the formula (II) is γ-methacryloxypropyltrimethoxysilane.

11. A composition according to claim 1 or 2, wherein the styrene series resin is in the form of beads or particles and is produced by conducting suspension polymerization in an aqueous medium a polymer solution comprising at least one styrene series polymer and at least one styrene series monomer and/or at least one vinyl series monomer, in which a compound of the formula:

$$XSiY_nR_{3-n} \qquad (II)$$

wherein X is an organic group having at least one copolymerizable double bond; Y is a hydrolyzable group; R is an inert monovalent organic group; and n is an integer of 1 to 3, is included as a part of component constituting said styrene series polymer and/or as a part of said vinyl series monomer.

12. A process for producing an expandable styrene series resin composition comprising a styrene series resin containing in its molecular structure one or more groups of the formula:

$$-SiY_nR_{3-n} \qquad (I)$$

wherein R is an inert monovalent organic group; Y is a hydrolyzable group; and n is an integer of 1 to 3, and a blowing agent, which comprises suspension polymerizing at least one styrene series monomer and at least one vinyl series monomer containing a compound of the formula:

$$XSiY_nR_{3-n} \qquad (II)$$

wherein X is an organic group having at least one copolymerizable double bond; and Y, R and n are as defined above, in an aqueous medium to give a styrene series resin, and impregnating the styrene series resin with a blowing agent during or after the completion of the polymerization to give the expandable styrene series resin composition in the form of beads or particles.

13. A process according to claim 12, wherein the styrene series monomer is used in an amount of 50% by weight or more based on the total amount of the monomers.

14. A process according to claim 12, wherein the compound of the formula (II) has a —OCH₃ group as Y.

15. A process according to claim 12, wherein the compound of the formula (II) has a group of the formula:

$$CH_2=C\overset{CH_3}{\underset{|}{\phantom{C}}}-\overset{O}{\underset{\|}{C}}OC_3H_6-$$

as X.

16. A process according to claim 12, wherein the polymerization in the aqueous medium is aqueous suspension polymerization.

17. A process for producing an expandable styrene series resin composition comprising a styrene series resin containing in its molecular structure one or more groups of the formula:

$$-SiY_nR_{3-n} \qquad (I)$$

wherein R is an inert monovalent organic group; Y is a hydrolyzable group; and n is an integer of 1 to 3, and a blowing agent, which comprises conducting suspension polymerization in an aqueous medium a polymer solution comprising at least one styrene series polymer and at least one styrene series monomer and/or vinyl series monomer, in which a compound of the formula:

$$XSiY_nR_{3-n} \quad (II)$$

wherein X is an organic group having at least one copolymerizable double bond; and Y, R and n one as defined above, is included as a part of the component constituting said styrene series polymer and/or as a part of said vinyl series monomer, and impregnating the resulting styrene series resin with a blowing agent during or after the completion of the polymerization to give the expandable styrene series resin composition in the form of beads or particles.

18. A process according to claim 17, wherein the polymer solution is obtained by conducting bulk polymerization of 0.1 to 50 parts by weight of the compound of the formula (II) and 50 to 99.9 parts by weight of one or more styrene series monomers and containing 95 to 40% by weight of unreacted components, and if required, adding the compound of the formula (II) and/or one or more other vinyl series monomers.

19. A process according to claim 17, wherein the styrene series monomers and/or the vinyl series monomers contain 50% by weight or more of styrene.

20. A process according to claim 17, wherein the compound of the formula (II) has a —OCH$_3$ group as Y.

21. A process according to claim 17, wherein the compound of the formula (II) has a group of the formula:

$$CH_2=C(CH_3)-COC_3H_6-$$

as X.

22. A process according to claim 17, wherein the styrene series resin contains the unit derived from the compound of the formula (II) in an amount of 0.1 to 50% by weight and the unit derived from the styrene series monomers and vinyl series monomers in an amount of 99.9 to 50% by weight.

* * * * *